EKSTRAND & CASSEL.
Wheel-Cultivator.
No. 49,512. Patented Aug. 22, 1865.
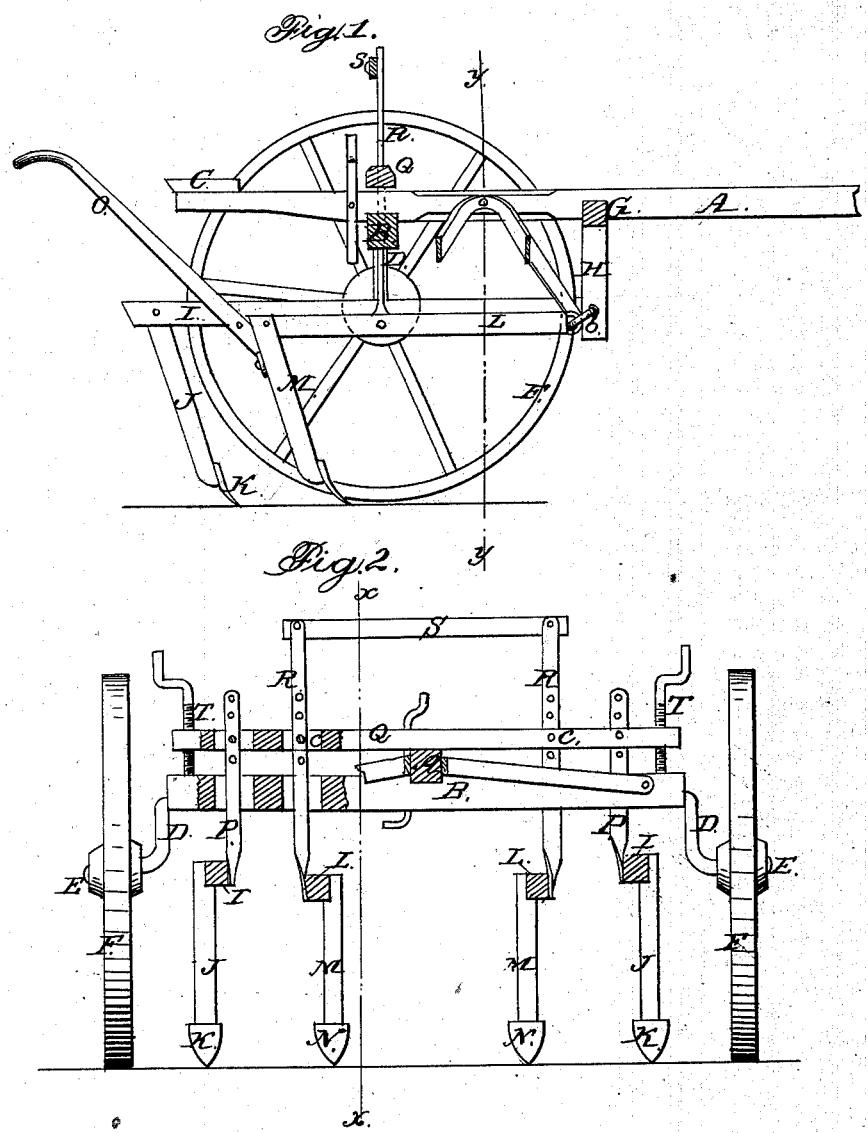
WITNESSES:
INVENTORS:
Geo Ekstrand
A. P. Cassel

UNITED STATES PATENT OFFICE.

G. EKSTRAND AND A. P. CASSEL, OF WATAGA, ILLINOIS.

IMPROVEMENT IN CULTIVATORS.

Specification forming part of Letters Patent No. 49,512, dated August 22, 1865.

*To all whom it may concern:*

Be it known that we, GEORGE EKSTRAND and A. P. CASSEL, of Wataga, in the county of Knox and State of Illinois, have invented a new and Improved Cultivator; and we do hereby declare that the following is a full, clear, and exact description thereof, which will enable others skilled in the art to make and use the same, reference being had to the accompanying drawings, forming part of this specification, in which—

Figure 1 is a side sectional view of our invention, taken in the line $x\,x$, Fig. 2; Fig. 2, a front sectional view of the same, taken in the line $y\,y$, Fig. 1.

Similar letters of reference indicate like parts.

This invention relates to a new and improved cultivator of that class in which laterally-adjustable plows are used in order that the plows may, while the device is at work, be moved to conform to the sinuosities of the rows of plants.

A represents a draft-pole, having a bar, B, attached to it transversely near its rear end, with the driver's seat C secured on it directly back of bar B.

To each end of the bar B there is secured an inclined bar, D, having each an arm or axle, E, at their lower ends, on which the wheels F are placed.

G is a bar attached transversely to the draft-pole directly in front of and parallel with B. This bar G has a pendant, H, secured to each end of it, and to the lower end of each pendant a beam, I is attached by a bolt, said bolts admitting of the rear parts of the beams being raised and lowered. The beams I have each a standard, J, at their rear ends, and to the lower ends of these standards plows K are attached, one to each.

To the lower ends of the standards J there are also attached, by universal joints $b$, beams L, provided with standards M and plows N at their rear ends. The universal joints $b$ admit of the plows N being not only raised and lowered, but also moved laterally, which may be done by the driver, when walking behind the machine, through the medium of handles O, attached to the rear of the beams L, and when riding by means of the feet acting upon the beams L.

The beams I I have upright bars P P attached to them, which pass up through the bar B and are secured in a bar, Q, above the bar B, and the beams L L have similar upright bars, R R, attached to them, which pass up through the bar Q, are secured therein by pivot-bolts $c$ and connected at their upper ends by a rod, S. The bar Q has a screw, T, passing vertically through each end of it, said screws resting upon the bar B. By turning these screws T the bar Q, and consequently the plows, may be adjusted higher or lower, as desired, while the connecting of the bars R R at their upper ends by a bar, S, causes the plows N to move simultaneously in a lateral direction.

The whole arrangement is extremely simple and efficient, and the plows are under the complete control of the operator or driver.

Having thus described our invention, we claim as new and desire to secure by Letters Patent—

The adjustable bar Q, having the plow-beams I I L L connected to it by the bars P R and the bars R connected at their upper ends by a bar, S, all being arranged and applied to a mounted framing, to operate in the manner substantially as and for the purpose set forth.

GEORGE EKSTRAND.
A. P. CASSEL.

Witnesses:
W. S. WOOD,
R. B. HADGEMAN.